UNITED STATES PATENT OFFICE.

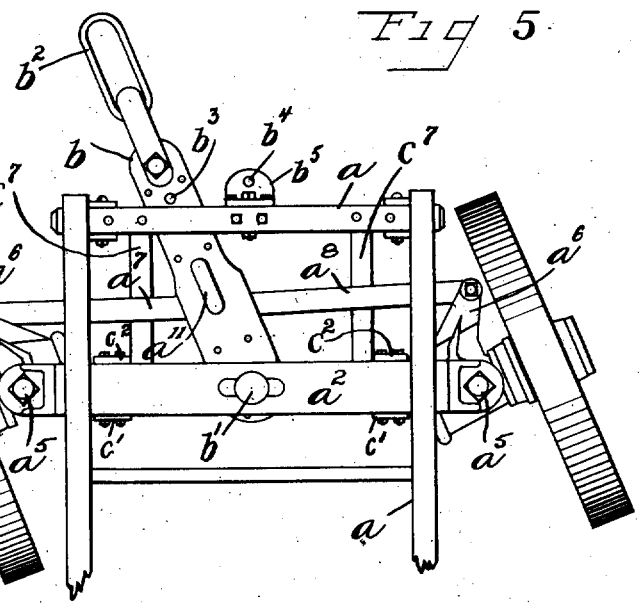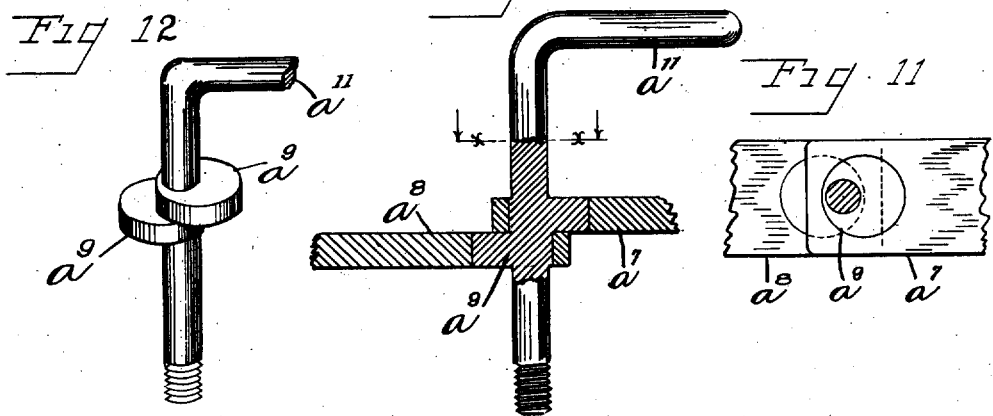

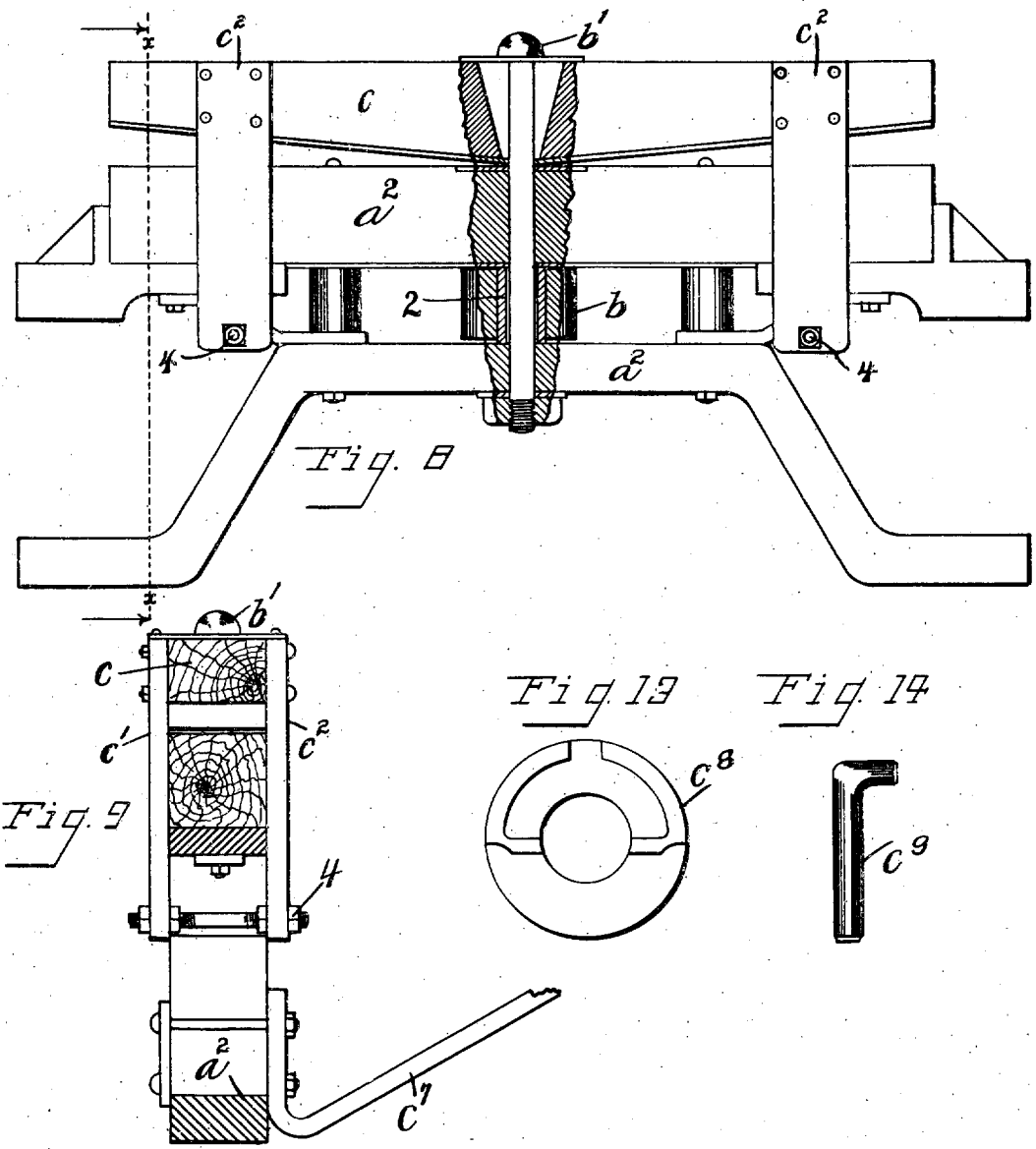

CHARLES A. GEIGER, JOHN F. ECCARD, AND RICHARD H. SOTHERLAND, JR., OF TROY, OHIO, ASSIGNORS TO THE TROY WAGON WORKS COMPANY, OF TROY, OHIO, A CORPORATION OF OHIO.

REVERSIBLE DUMP-WAGON.

No. 903,185.　　　Specification of Letters Patent.　　　Patented Nov. 10, 1908.

Application filed February 11, 1908. Serial No. 415,449.

*To all whom it may concern:*

Be it known that we, CHARLES A. GEIGER, JOHN F. ECCARD, and RICHARD H. SOTHERLAND, Jr., citizens of the United States, residing at Troy, in the county of Miami and State of Ohio, have invented certain new and useful Improvements in Reversible Dump-Wagons, of which the following is a specification.

Our invention relates to dump wagons and particularly bottom dump wagons.

Our object is to construct a reversible dump wagon and by that we mean a wagon that can be moved or drawn either frontwards or backwards, and one that can be most advantageously used in a series coupled together.

It is now common practice to couple a series of dump wagons, constituting a train and operate this train by motive power such as a traction engine for hauling purposes. In operating a train of dump wagons, as just mentioned, it is obvious that it is very desirable to reverse the direction of movement of the train of dump wagons in order to avoid the necessity of turning the entire train of wagons, as for instance if the wagons are hauling dirt or other excavating material from a loading point to a dumping point. Our construction is such that a single dump wagon with the improvements as arranged in our invention can be readily used in places where it is desirable that a single wagon be backed out of the blind alley or other difficult places to enter, and when the wagons are coupled together as a train, the entire train of wagons can be pulled backwards by uncoupling the engine furnishing the motive power from the front thereof and while the engine is being moved to the rear of the train the couplings and connections for the train of dump wagons can be quickly and readily shifted so that when the engine is coupled to the rear end of the train, the entire train of wagons can be returned to the starting point.

Figure 1:
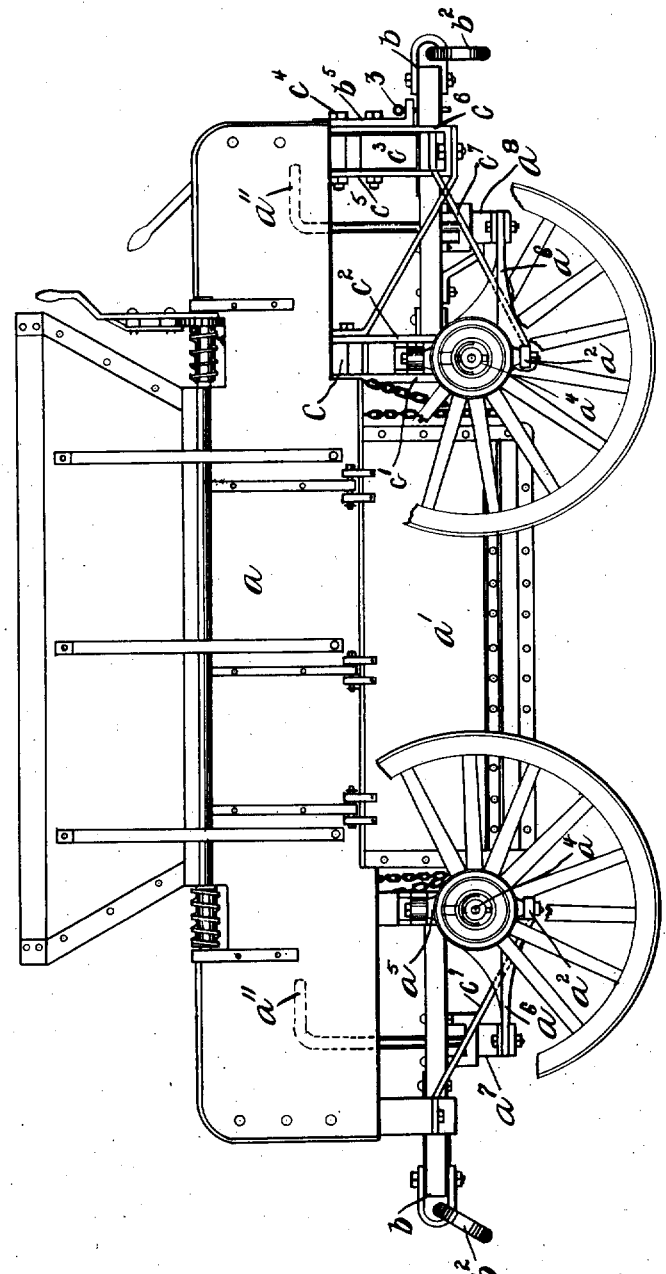
Figure 2:
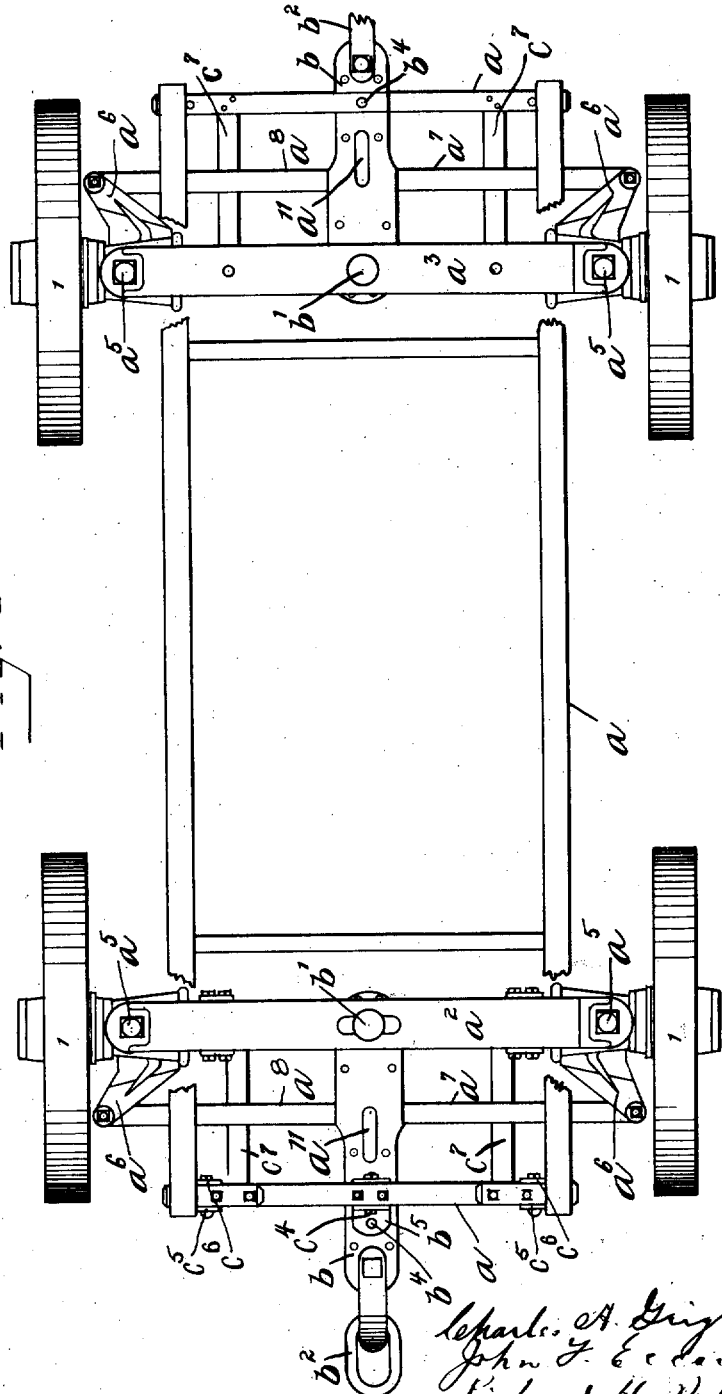
Figure 3:
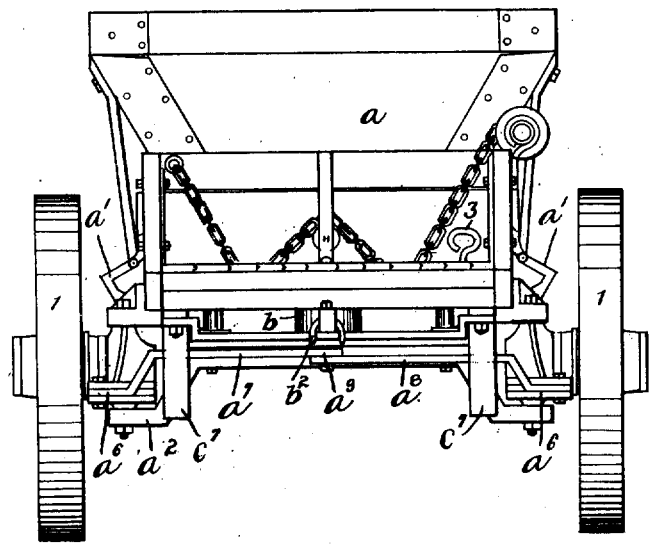
Figure 4:
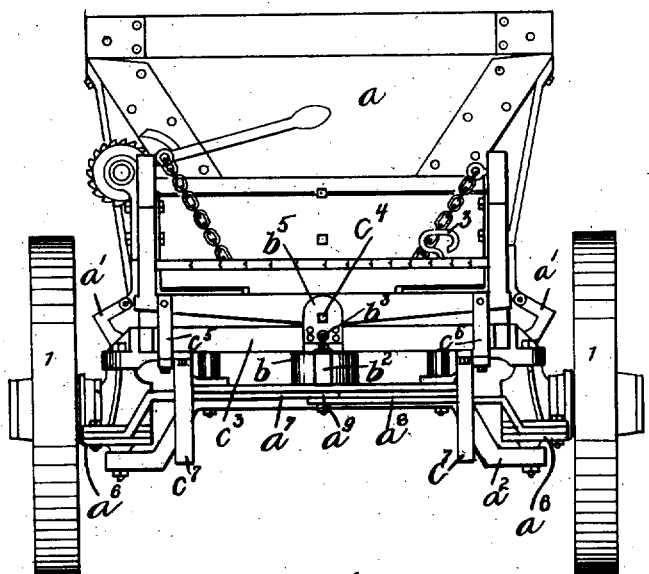
Figure 6:
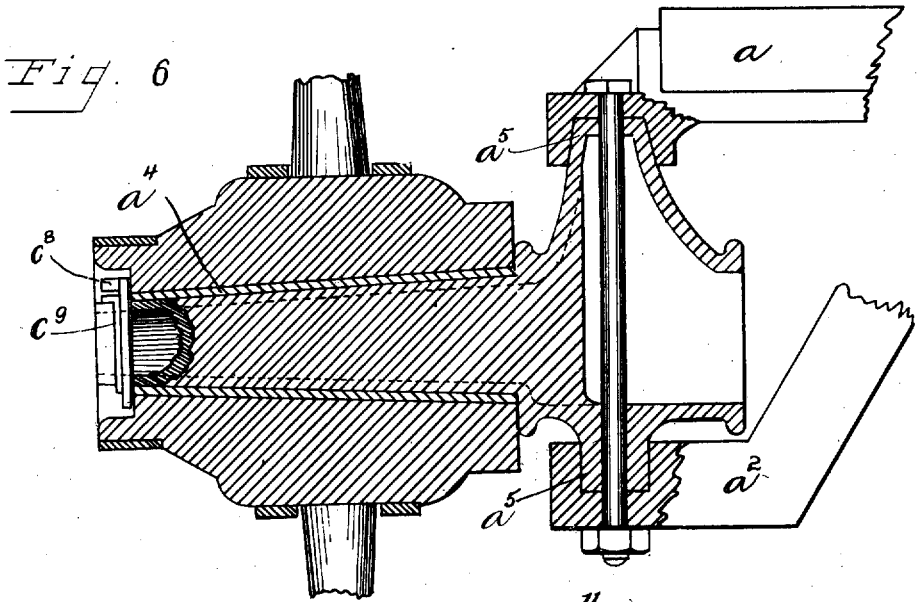
Figure 7:
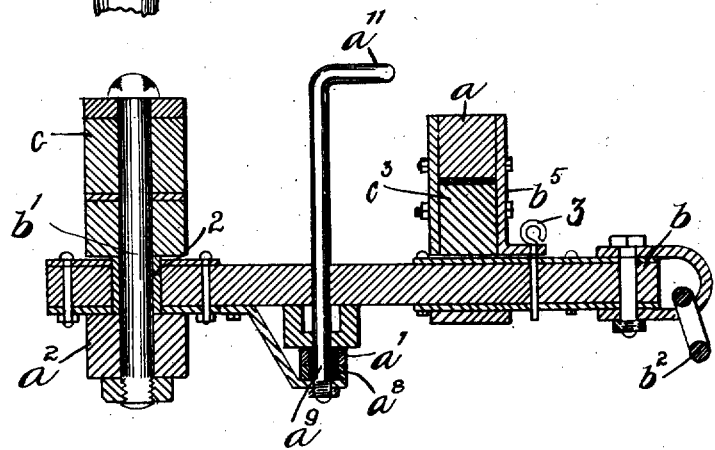

Figure 1 is a side view of our reversible dump wagon. Fig. 2 is a plan view. Fig. 3 is a rear view thereof. Fig. 4 is a front view. Fig. 5 is a plan view of the front running gear. Fig. 6 is a sectional view of the wheel spindles and bearings therefor. Fig. 7 is a longitudinal sectional view through the center of a draft-bar. Fig. 8 is a detail view of the front axle and bolster therefor. Fig. 9 is a sectional view on the line $x\ x$ of Fig. 8. Figs. 10, 11, and 12 are detail views of the eccentric device for changing the gather of the spindles or wheels. Figs. 13 and 14 are detail views of the collar and linch pin for the wheels.

Like parts are represented by similar letters of reference in the different views.

The wagon bed is indicated by the reference letter $a$, having the ordinary hinged bottom portions indicated by $a^1$. The general construction of the dump wagon is that in common use at the present time, being so arranged that the bottom can be readily opened to discharge the load, and the connections, as arranged in our improved dump wagon, are such that there can be no interference with this dumping operation. The wheels of the wagon are indicated by the numeral 1. We have shown the front and rear axles, $a^2\ a^3$, (see Fig. 2) preferably of iron with bifurcated end portions and the spindles for the wheels are pivoted within the bifurcated end portions. The spindle, $a^4$, for each wheel (see Fig. 6) is tapered, as is usual in this kind of construction, and the inner portion of the spindle is perforated and is formed with vertical bearings which coöperate with seats in the bifurcated parts of the axle to permit a lateral swinging movement of the spindles. The trunnion, $a^5$, extends through the perforations in the end portion of the spindle and through the bifurcated ends of the axle, the parts being bolted together so that the trunnion constitutes a pivot for said swinging spindle. Each spindle is formed with an arm $a^6$ which projects therefrom (see Figs. 2 and 5) and the arms of the spindles are connected by bars $a^7\ a^8$. These connecting bars are disjointed and at their free ends are operated by eccentrics $a^9$ (Figs. 10-11-12) and the eccentrics $a^9$ are controlled by the hand lever $a^{11}$, the lower end of which fits into a socket which is supported by brackets extending from the draft bars of the wagon.

In our construction of axles, spindle, draft bar and connecting bars our object is to so arrange the parts that by operating either the front or rear draft bar the wagon can be guided frontwards or backwards, while permitting an adjustment of the spindles by operating the hand lever $a^{11}$ independent of the swinging movement of the draft bar so as to set the gather of the wheels, for either front or rear movement. This adjustment of the spindles can be readily made by turning the hand lever while the engine or other device furnishing the motive power is being uncoupled from one end of the train of wagons and moved to the opposite end, it being understood, of course, that each wagon will have to be adjusted in this respect for adapting it to the changed direction in movement. When the train of wagons is moving in a normal direction, i. e. the front of the first wagon in the train coupled to the traction engine, the front draft bar on each wagon will be free to swing laterally and thereby guide each wagon each rear draft bar being held rigid during this movement so as to prevent all lateral swinging movement of the rear wheels, but when the direction of movement of the wagon is reversed, the front draft bar will be made rigid so that the front wheels can no longer swing laterally and the rear draft bar of each wagon will be released from its rigid connections so as to permit the rear wheels to swing laterally while the train of wagons is being drawn in a reverse direction. For this reason we have shown the front and rear draft bars $b$ pivotally secured at $b^1$ to the axle of the wagon. The front draft bar $b$ (see Figs. 7 and 8) is pivotally secured between the bolster and the axle $a^2$, there being a sleeve indicated by the numeral 2 which fits over the king bolt $b^1$, and this sleeve 2 is of such dimensions that the draft bar $b$ swings freely upon the sleeve between the bolster and axle as shown clearly in Fig. 8. The rear axle does not employ a rocking bolster so that the rear draft bar is pivotally secured direct to the rear axle and each draft bar $b$ at its free end has a coupling $b^2$ for connecting the wagon to the traction engine or other motive power device or in case the wagon is to be used as an ordinary horse drawn dump wagon, said draft bar will constitute means for connecting the tongue to the wagon.

The disconnecting means for the draft bars is as follows: An opening $b^3$ which, when the draft bar is to be held rigidly secured to prevent any swinging lateral movement of the wheels, registers with an opening $b^4$ which is formed in a plate $b^5$ secured to the bed $a$ of the wagon and a pin 3 (Fig. 7) can then be inserted through the openings $b^3$ $b^4$ and thereby the draft bar will be secured rigidly to the bed of the machine. By releasing the pin 3, the draft bar becomes disconnected and can then be used as a draft appliance for guiding the wheels to which it is connected, and it is to be remembered that the adjustment in the gather of the wheels by operating the hand lever $a^{11}$ can readily be made so as to adjust the wheels for a change in the direction of movement of the wagon.

Further explaining the construction of the rocking bolster, heretofore referred to, it will become apparent that in this construction of a dump wagon it is especially desirable that one of the axles should have a limited vertical movement independent of the bed to prevent any straining or twisting effect that would otherwise occur when the wheels of the wagon were traveling over uneven surfaces. For this reason and for other reasons we employ two rocking bars shown clearly in Figs. 1 and 8. The rocking bar $c$ is secured to the front axle by the king bolt $b^1$, heretofore referred to, and the rocking bolster securely supports the bed $a$ as shown in Figs. 3, 4, and 1 so that the bolster and axle will work independently of each other. The ends of the bolster $c$ extend between plates or guides $c^1$ and $c^2$ and bolted rigidly to the bolster $c$, and these plates or guides being rigidly attached to the bolster $c$ project downwardly on either side of the axle $a^2$, (Fig. 8) allowing the bed $a$ and bolster to work in unison and the axle $a^2$ to work independently of the bed $a$ and bolster $c$ as shown in Figs. 8 and 9. The other rocking bar $c^3$ lies at the extreme front of the wagon bed and the rocking bar is pivotally secured to the bed $a$ by a pivot $c^4$ (see Fig. 4) and the ends of the rocking bar also project between rigid plates or braces $c^5$ and $c^6$ (Figs. 1 and 4) projecting from the bed $a$. Attached rigidly to the plates $c^5$, $c^6$ are braces not lettered extending backwardly to the plate $c^2$. Attached to the bottom of the bar $c^3$ (Fig. 1) are braces $c^7$, extending downwardly and backwardly to the axle making a rigid connection between $c^3$ and $a^2$ and making a very strong construction of the front axle, while permitting a very desirable vertical movement of the axle and front bar $c^3$ independent of the bed.

In order to prevent the wheels from working loose from the spindles when the direction of the movement of the wagon is reversed we have shown collars $c^8$ (see Figs. 6 and 13) which fit on the free end of the spindles and are held thereon by linch pins, $c^9$, in the ordinary or usual way. In order to adjust the guides we have shown an adjustable clamping device 4 of any ordinary construction (see Fig. 9).

Having described our invention we claim as follows:—

1. In a dump wagon, the combination of front and rear axles with the bed for said wagon, a plurality of independent rocking bolsters for the front axle, and means for connecting said axle to one of said rocking bolsters, substantially as specified.

2. In a reversible dump wagon, the combination of a wagon bed with front and rear axles, a rocking bolster for the rear axle, and a plurality of rocking bolsters for the front axle, means connecting the front axle with one of said rocking bolsters, and means for connecting the bed of said wagon with other rocking bolster, substantially as specified.

3. In a reversible dump wagon, the combination of a wagon bed with front and rear axles including pivoted spindles, front and rear draft bars pivotally secured to their corresponding axles, connections between each draft bar and their corresponding spindles, wheels for said spindles and means for changing the gather of said wheels independent of the movement of the draft bars, and means for disconnecting each of said draft bars from said wagon bed, for the purpose specified.

4. In a reversible dump wagon, the combination of wagon bed with front and rear axles including pivoted spindles, front and rear draft-bars pivotally connected to each axle, a plurality of rocking bolsters for the front axle, one of said bolsters being located forwardly of the other, and the front draft-bar being pivoted between the axle and the rearmost rocking bolster and extending forwardly below the front rocking bolster, substantially as specified.

5. In a reversible dump wagon, the combination of front and rear axles including spindles with the bed for said wagon, and connections between the spindles and draft-bars, a plurality of rocking bolsters for one of said axles, a pivotal connection for one of said draft-bars between the axle and rocking bolster, said draft-bar extending below the other rocking bolster, and means for connecting the axle with said last mentioned rocking bolster, substantially as specified.

6. In a reversible dump wagon, the combination of front and rear axles including pivoted spindles, a plurality of rocking bars for the front axle, one of said rocking bars being located forwardly of the axle and a brace extending from said axle to said last mentioned rocking bar, for the purpose specified.

In testimony whereof, we have hereunto set our hands this 3rd day of February 1908.

CHARLES A. GEIGER.
JOHN F. ECCARD.
RICHARD H. SOTHERLAND, JR.

Witnesses:
H. E. BRUCE,
F. M. CHASE.